United States Patent [19]

Jyojiki et al.

[11] 4,349,254

[45] Sep. 14, 1982

[54] CAMERA FOCUS DETECTING DEVICE

[75] Inventors: Masao Jyojiki, Tsurugashima; Harumi Aoki, Kiyose, both of Japan

[73] Assignee: Asahi Kogaku Kogyo Kabushiki Kaisha, Tokyo, Japan

[21] Appl. No.: 118,057

[22] Filed: Feb. 4, 1980

[30] Foreign Application Priority Data

Feb. 13, 1979 [JP] Japan ............................ 54-15256
Feb. 13, 1979 [JP] Japan ............................ 54-15257

[51] Int. Cl.$^3$ ............................................. G03B 7/08
[52] U.S. Cl. ........................................ 354/25; 354/31; 354/195; 250/201
[58] Field of Search ................ 354/25, 31, 195; 350/46; 250/201, 209; 352/140; 355/56

[56] References Cited

U.S. PATENT DOCUMENTS

| 3,450,883 | 6/1969 | Thomas | 250/204 |
| 4,005,443 | 1/1977 | Albrecht | 354/25 |
| 4,214,826 | 7/1980 | Uchida | 354/31 |
| 4,220,850 | 9/1980 | McEachern | 354/25 |

OTHER PUBLICATIONS

IBM Technical Disclosure Bulletin, vol. 15, No. 2, Jul. 1972, pp. 504, 505, Optical Surface Microtopography Measurement and for Automatic Focussing.

Primary Examiner—G. Z. Rubinson
Assistant Examiner—S. D. Schreyer
Attorney, Agent, or Firm—Sughrue, Mion, Zinn, Macpeak & Seas

[57] ABSTRACT

A focus detecting device for a camera in which at least first and second groups of light receiving elements are disposed in planes parallel to each other and to the plane of the film in the camera. The absolute values of the difference between the signals from adjacent elements in each group are summed from which is determined the amount of high frequency components in the frequency spectrum of the image being photographed. From this, a processing circuit produces a signal representative of correct focalization when the amounts of the high frequency components are higher than a predetermined level and are equal to each other.

8 Claims, 23 Drawing Figures

CAMERA FOCUS DETECTING DEVICE

BACKGROUND OF THE INVENTION

The present invention relates to focus detecting devices for cameras. More particularly, the invention relates to a device for detecting the contrast of an image formed by a photographing lens to detect focalization.

It has been known in the art that the relation between the amount of non-focalization, specifically, the distance between the plane of an image at the point of focalization and the plane of an image at the point of non-focalization and the amount of high frequency components of the spatial frequency spectrum of an image can be represented by a symmetrical characteristic curve having a single peak as shown in FIG. 1. Accordingly, as the amount of non-focalization increases the amount of high frequency component decreases.

A technique for detecting the amount of high frequency components has been known in which an array of light receiving elements having uniform photoelectric characteristic and arranged along a straight line is disposed in a plane parallel to the plane of an image. In this arrangement, the amount of high frequency components is detected from the sum of the differences in output between adjacent light receiving elements. For convenience for the description, which follows the amount of high frequency components thus determined will be referred to hereinafter as "a contrast output".

SUMMARY OF THE INVENTION

In a focus detecting device according to the invention, a contrast detecting light receiving element array, hereinafter referred to as "a sensor" when applicable, is disposed in each of more than two planes on both sides of the film surface, namely, the plane of an image at the point of focalization, in a single-lens reflex camera. Plural outputs of the sensors are compared thereby to detect front focus, correct focus and rear focus.

Further in accordance with the invention, there is provided a focus detecting device for a camera including two groups of light receiving elements disposed along the optical axis of a photographing lens in two planes which are parallel to each other with one of the planes lying on each side of a plane optically equivalent to a film surface, a circuit for analyzing outputs of the two groups of light receiving elements for detecting the amount of high frequency components in the spatial frequency spectrum of the image of an object to be photographed for each of the groups of light receiving elements, and a processing circuit for producing a signal representative of correct focalization when the amounts of high frequency components thus detected are higher than a predetermined level and are equal to each other.

DESCRIPTION OF THE PREFERRED EMBODIMENTS

Figure 1:
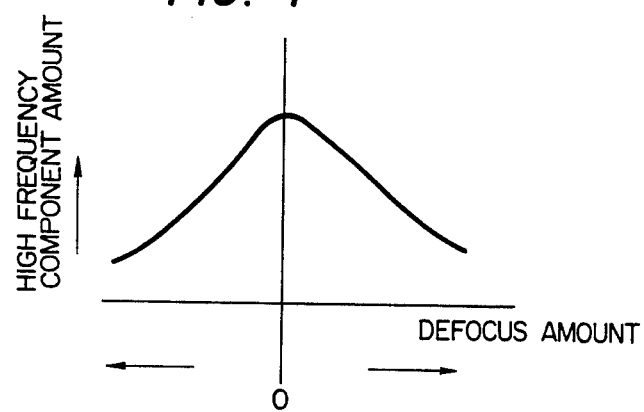
FIG. 1 is a graph for illustrating a principle utilized in the operation of the device of the invention.
Figure 2:
FIG. 2 shows an array of sensor elements utilized in the device of the invention.
Figure 3:
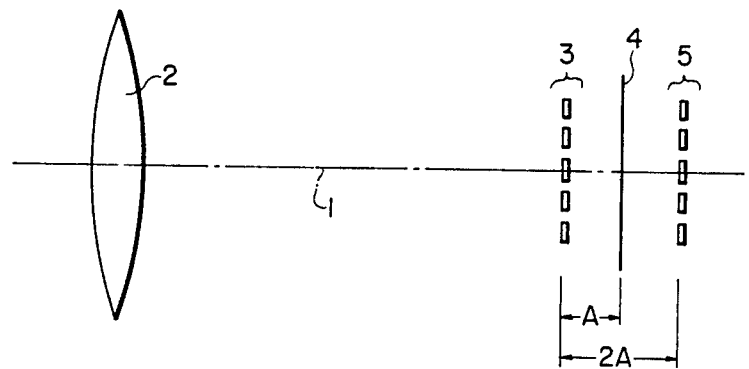
FIG. 3 is a cross-sectional view of a photographing lens and two groups of light receiving elements utilized in illustrating a principle of operation of the present invention.

FIG. 3 is an explanatory diagram for a description of the principles of operation of a device according to the invention. In the case illustrated, two sensors are employed. In FIG. 3, reference numeral 1 designates the optical axis of a photographing lens 2; 4, a film surface; 3, a first sensor spaced by a distance A toward the lens from the film surface 3; and 5, a second sensor spaced by the same distance A in the opposite direction from the film surface 3.

The sensors 3 and 5 and the film surface 4 are arranged in such a manner that they do not obstruct one another during an exposure operation. When the plane of an image formed by the photographing lens 2 is between the film surface 4 and the lens as in the case of front focus, the contrast output of the first sensor 3 is greater than that of the second sensor 5. On the other hand, when the plane of an image formed by the photographing lens 2 is behind the film surface 4 in the case of rear focus, the contrast output of the second sensor 5 is greater than that of the first sensor 3. When the plane of the image coincides with the film surface 4, the outputs of the two sensors 3 and 5 are equal to each other.

Figure 4:
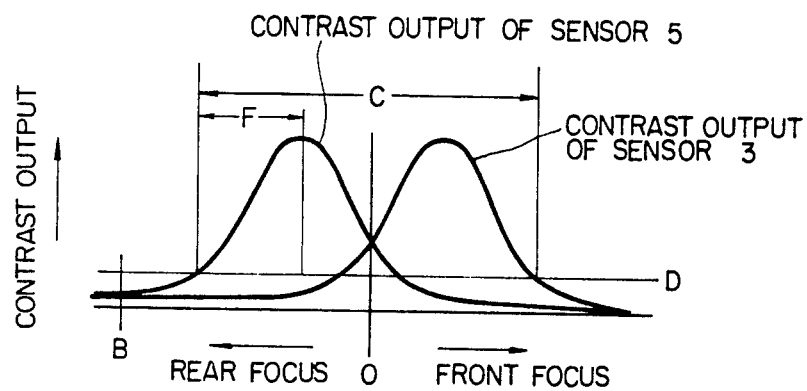
FIG. 4 and FIG. 5 are graphs showing sensor output vs. focussing position utilized in explaining the operation of a device of the invention.

The operation will become more apparent from FIG. 4 in which the horizontal axis represents the distance of the photographing lens from the point of correct focus while the vertical axis represents output power from the sensors. When the result obtained by subtracting the contrast output of the sensor 3 from the contrast output of the sensor 5 is positive, the lens is focused in front of the object, that is, front focused. When the result is negative, the lens is focused behind the object, that is, rear focused. When the result is zero, the lens is correctly focused on the object. In the case where the plane of the image is very far from the sensor, for instance a position indicated by B in FIG. 4, the contrast outputs vary extremely slowly and, accordingly, the difference between the two contrast outputs is very small. Therefore, if the contrast signals contain significant amounts of noise, it is impossible to accurately compare the contrast signals. That is, the difference between the outputs of the sensors 3 and 5 may be zero not only when the lens is correctly focused on the object but also when the lens is greatly defocused.

Figure 5:
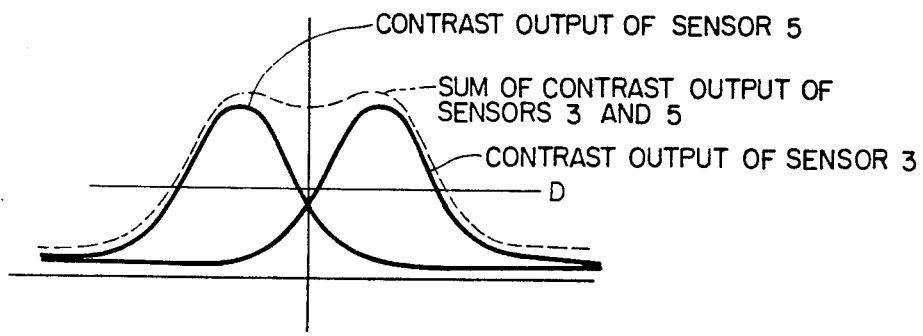

In order to distinguish the two cases from each other in order to detect the correct focus point, the following conditions should be employed. Namely, it should be determined that two contrast outputs are higher than a predetermined level and that the contrast output of the sensor 5 is equal to that of the sensor 3. The case where the lens is greatly defocused can be detected from the fact that a low contrast output is present. The predetermined level is indicated as line D in FIG. 4. A focalization signal representative of the fact that the lens is focused on an object may be outputted when the sum of the two contrast outputs is higher than a predetermined level and the output of the sensor 5 is equal to that of the sensor 3. In this case, the contrast outputs of the sensors are as indicated in FIG. 5. As is clear from FIG. 5, a level indicated by D is higher than the corresponding level in FIG. 4. Therefore the probability of erroneous determination of the correct focus point as caused by noise is reduced accordingly.

Figure 6:
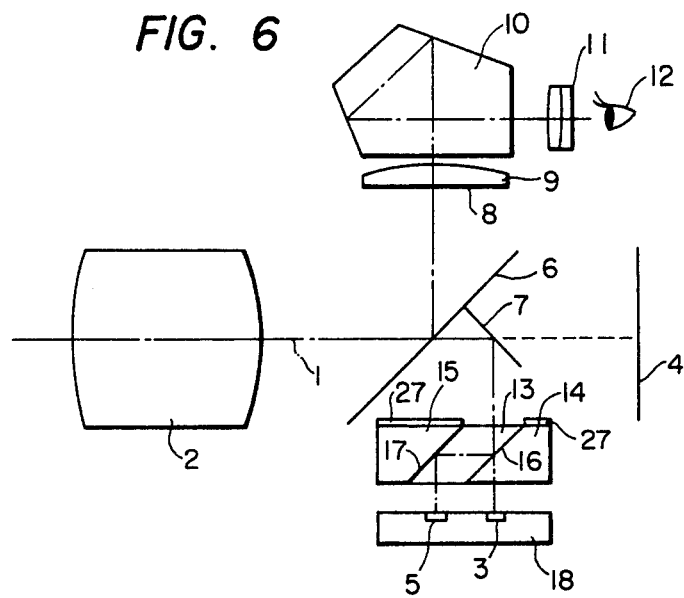
FIG. 6 is a cross-sectional view of an automatic focus detecting device of the invention.

FIG. 6 shows an example of a single-lens reflex camera incorporating a two-sensor type focus detecting device according to the invention. Light from a photographing lens 2 is divided into two parts by a half-silvered mirror 6. One of the two parts advances upwardly and is observed by the photographer's eye 12 through a focusing surface 8, a condenser lens 9, a penta-prism 10 and a magnifier 11. The other part is reflected downwardly by a second mirror 7 into an optical member including glass blocks 13, 14 and 15. The light in the optical member is further divided into two parts. One of the two parts advances straight to a sensor 3. The other is reflected by a half-silvered mirror 16 and a mirror 17 to a sensor 5. The distance of the sensor 3 from the photographing lens 2 is different from the distance of the sensor 5 from the lens 2 with the difference between the two distances being equal to the distance 2A indicated in FIG. 3. That is, the difference is equal to a result which is obtained by dividing the distance between the sensors 3 and 5 by the refractive index of the glass block 13 in the case where the inclination angle of each of the half-silvered mirror 16 and the mirror 17 with the optical axis is 45°. A plane whose optical distance from the photographing lens 2 is equal to the distance between the lens 2 and the film surface 4 will be referred to as "an equivalent film surface". This equivalent film surface is located halfway between the sensors 3 and 5. In FIG. 6, reference numeral 18 designates a substrate which supports the sensors 3 and 5 while reference numeral 27 designates a light shielding plate for blocking unwanted light.

Figure 7:
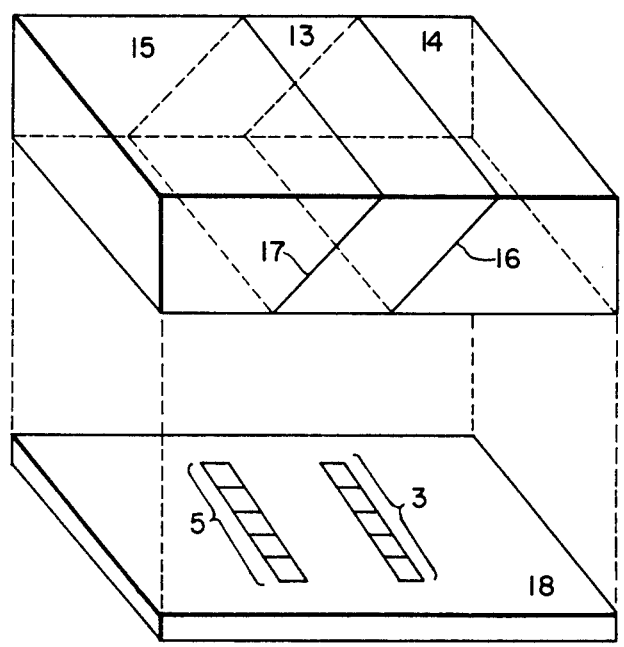
FIG. 7 is a perspective view showing glass blocks and sensors of the embodiment of FIG. 6.

FIG. 7 is a perspective view showing the glass blocks 13, 14 and 15 and the sensors 3 and 5. The sensors 3 and 5 are arranged and the mirror 17 and the half-silvered mirror 16 are held as shown in FIG. 7.

Figure 8:
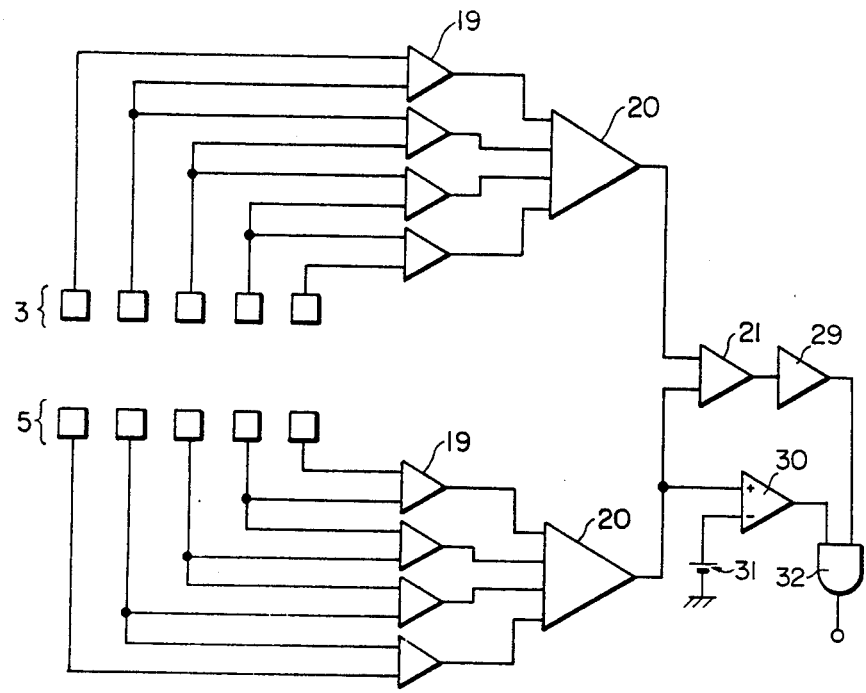
FIG. 8 is a circuit diagram showing a processing circuit used with the focus detecting device of the invention.

FIG. 8 is a circuit diagram showing an example of a processing circuit employed in a focus detecting device according to the invention. The operation of the processing circuit, in which a focalization signal is produced from the output signals from the sensors will next be described. Each of the sensors 3 and 5 has five light receiving elements which have uniform photoelectric characteristics. The outputs of two adjacent light receiving elements are compared in the comparator circuits 19 from which the absolute value of the difference between the outputs is obtained. The absolute values determined by the circuits 19 are summed in a circuit 20 from which a contrast output is provided as a voltage.

Figure 9:
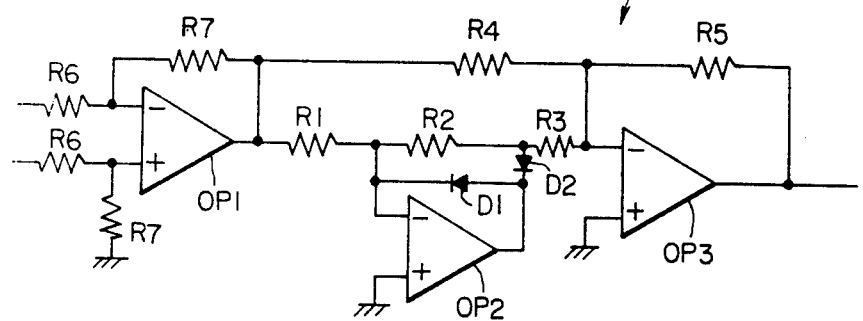
FIG. 9 is a circuit diagram of a circuit for producing absolute values of differences utilized in the circuit of FIG. 8.

An example of the circuit 19 for producing the absolute value of the difference between the outputs of adjacent light receiving elements is shown in FIG. 9. In the circuit 19, an operational amplifier $OP_1$ outputs the difference between two signals applied thereto through resistors $R_6$. The aforementioned absolute value is formed by a circuit including operational amplifiers $OP_2$ and $OP_3$, diodes $D_1$ and $D_2$ and resistors $R_1$ through $R_6$.

Figure 10:
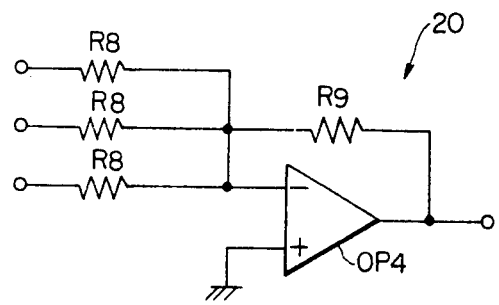
FIG. 10 is a circuit diagram of an addition circuit utilized in the circuit of FIG. 8.

An example of the above-described addition circuit 20 is shown in FIG. 10 in which reference characters $R_8$ and $R_9$ designate resistors and $OP_4$ an operational amplifier.

Referring back to FIG. 8, the contrast outputs of the sensors 3 and 5 are provided by the circuits 19 and 20. The contrast outputs thus provided correspond to the two outputs as shown in FIG. 4. The difference between the two outputs is produced by a differential amplifier 21. The difference signal is applied to the aforementioned comparator 29. The comparator 29 operates to determine whether or not the difference between the contrast outputs of the sensors 3 and 5 can be regarded as zero with noise taken into account. If in fact the difference can be regarded as zero the circuit 29 outputs a high logic level or "H" signal. A comparator 30 operates to determine whether the contrast output of the sensor 5 is higher than the predetermined level. Since the contrast signal is a voltage, the voltage is compared with the constant voltage of a voltage source 31. When the contrast signal is higher than the constant voltage, the comparator 30 outputs an "H" signal. The outputs of the circuits 29 and 30 are applied to an AND circuit 32. When both of the outputs are "H" levels, the AND circuit 32 produces an "H" output which indicates correct focalization.

The difference between the contrast outputs of the sensors 3 and 5 is outputted by the circuit 21 as described above. When the output is positive, the lens is focused behind the object (rear focus) and when it is negative, the lens is focused in front of the object (front focus).

Figure 12:
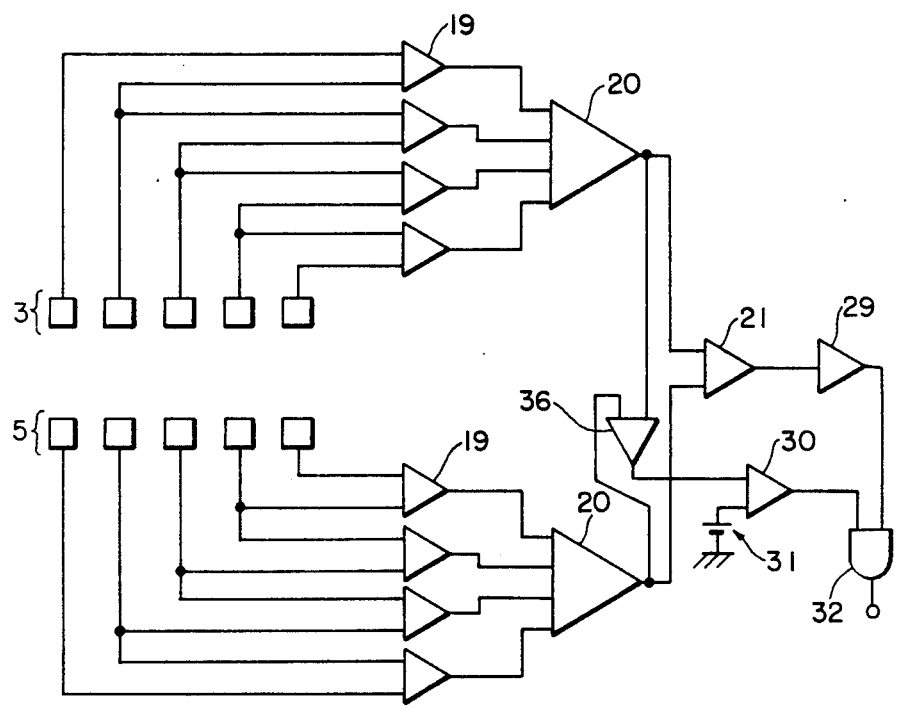
FIG. 12 is a second example of a processing circuit used with the invention.

Another example of the processing circuit is shown in FIG. 12 in which an addition circuit is further provided so that the sum of two contrast outputs is applied to the comparator 30. In this case, the reference or comparison voltage can be set high as described before so that the focus detection operation is very little affected by noise.

Figure 13:
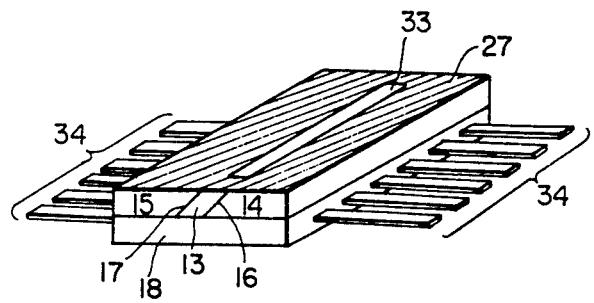
FIG. 13 is a perspective view showing a focus detecting device constructed in the form of a flat package utilizing integrated circuit techniques.

FIG. 13 is a perspective view showing a preferred embodiment of a focus detecting device according to the invention. The device is in the form of a flat package which may be produced according to IC techniques. The device includes a light shielding plate 27 for preventing unwanted light from entering the device, a opening 33 formed in the light shielding plate 27 to allow necessary light to enter the device, input and output pins 34 of the processing circuit which is provided in the form of an integrated circuit, and a package 35 made of ceramic or the like. In FIG. 13, the sides of the glass block assembly are exposed so that the arrangement of the elements 13, 14, 15, 16, 17 and 18 can be seen. However, the sides should be coated with light shielding material.

An automatic focus adjusting device can be readily provided in accordance with the invention because the device can accurately detect front focus, correct focus and rear focus. A self-scanning type image sensor may be employed as the sensor.

Figure 14:
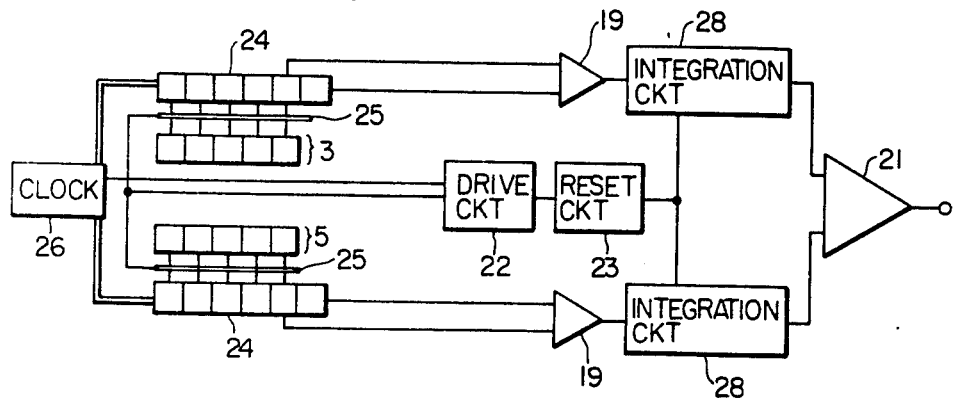
FIG. 14 shows another example of a processing circuit used with the invention.

FIG. 14 shows an example of a processing circuit used with the invention using self-scanning type image sensors and analog charge transfer elements such as a CCD or BBD. The outputs of sensors 3 and 5 are transferred through transfer gates 25 to transfer elements 24 and are successively shifted to the right as viewed in FIG. 14 in response to clock pulses generated by a clock pulse generator 26. The number of the transfer elements 24 is larger by one bit than the number of the light receiving elements and the assembly of transfer elements 24 has taps so that a signal at the last element and a signal at the element next to the last element can be simultaneously outputted. Accordingly, the outputs of adjacent light receiving elements are simultaneously applied to a comparison circuit 19. The comparison circuit is equal in construction to that shown in FIG. 9. That is, it is so designed that the absolute value of the difference between two input signals is provided. The difference absolute value signal provided by the comparison circuit 19 is integrated by an integration circuit 28 into a contrast output.

Figure 15:
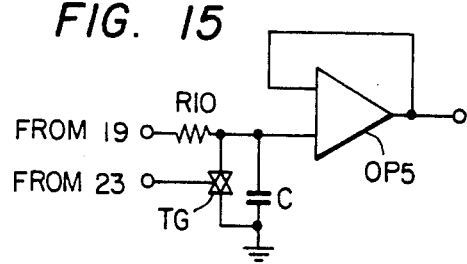
FIG. 15 is a circuit diagram of an integration circuit used with the circuit of FIG. 14.

An example of the integration circuit 28, shown in FIG. 15, includes an operational amplifier $OP_5$, a capacitor C, and a transfer gate TG serving as a switch to short-circuit the capacitor C.

Referring back to FIG. 14, reference numeral 23 designates a reset circuit for the integration circuit. The reset circuit operates to reset the contrast output for every scanning period. Reference numeral 22 designates a drive circuit for the transfer gates 25. The contrast outputs of the sensors 3 and 5 are provided as the outputs of the integration circuits 28, respectively. The operation of the processing circuit shown in FIG. 14, which is effected after the provision of the contrast outputs, is similar to that of the processing circuit shown in FIG. 8.

Figure 16:
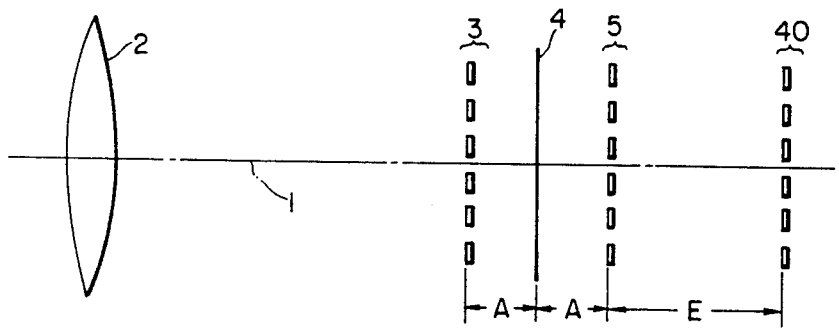
FIG. 16 is a diagram used for a description of the principles of operation of another embodiment of a focus detecting device of the invention.

A second embodiment of a focus detecting device according to the invention will be described in which three sensors are employed. FIG. 16 is a diagram for a description of the principles of operation of this embodiment. The three sensors 3, 5 and 40 are disposed as shown in FIG. 16. The positions of the sensors 3 and 5 are the same as those shown in FIG. 3. However, the additional sensor 40 is spaced by a distance E from the sensor 5 on the same side of the film surface 4.

Figure 17:
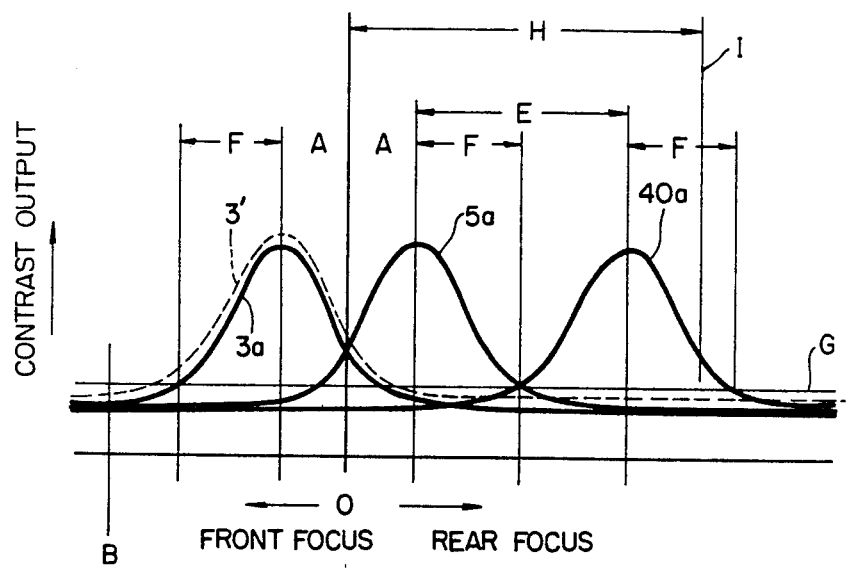
FIG. 17 is a graph indicating the contrast outputs of the sensors in the embodiment of FIG. 16 for various lens positions.

FIG. 17 indicates the contrast outputs of the sensors 3, 5 and 40 which result as the photographing lens is moved. In FIG. 17, reference characters 3a and 5a and 40a designate the contrast outputs of the sensors 3, 5 and 40, respectively.

When the plane of an image is very far from the sensors as indicated by B in FIG. 17 similar to the case where two sensors 3 and 5 are employed, the contrast outputs vary quite slowly with respect to the lens position. Accordingly, in this case, the difference between the contrast outputs 3a and 5a is very small. Therefore, if noise is present in the contrast signals, it is impossible to accurately compare the contrast outputs.

In order to make it possible to accurately compare the contrast outputs 3a, 5a and 40a, the amount of defocus must be smaller than a certain range. If this range is represented by F, then the range of defocus in which the contrast outputs 3a and 5a can be accurately compared is $F+A+A+F=2F+2A$. Sometimes a single-lens reflex camera is provided with a photographing lens having a large diameter and a long extension distance from closest focus position to infinite focus position such as for instance 15 or 16 mm. In the case where an object having fine patterns is observed through such a lens, the contrast with respect to the amount of defocus is very low and the value F mentioned above is small. Therefore, it is impossible to cover the entire extension distance of the lens with the range of defocus $2A+2F$.

In order to eliminate this difficulty, the sensor 40 is provided. That is, the provision of the sensor 40 increases the extension distance of the lens by E. The extension distance is 2F at the maximum. Therefore, the range of defocus in which the signals can be compared is increased to $2A+4F$ at the maximum. If the range of defocus $A+E+F$ is larger than the extension distance H of the lens, for instance in the case of H as shown in FIG. 17, a defocus direction detection signal for front focus or rear focus display and lens extension direction indication can be produced by the provision of a suitable circuit even when the photographing lens is maximumly defocused. When a close object is observed with the photographing lens set for infinite distance, then the plane of the image will be at the position I in FIG. 17. In this case, the output of the sensor 40 is greater than that of the sensor 3 from which it can be determined that the lens is rear focused. On the contrary, when an object at infinite distance is observed with the photographing lens set for a close object, the differences between the sensors 3, 5 and 40 are typically not greater than the noise. In the case of rear focus, the output of the sensor 3 is smaller than that of the sensor 5 or 40 from which fact it can be determined that the lens is front focused. The width E cannot be increased to more than 2F. Therefore, for a photographing lens having a larger diameter and a longer extension distance, an additional sensor similar to the sensor 40 should be provided in order to increase the range of detection.

Figure 18:
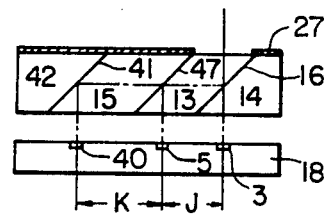
FIG. 18 is a sectional view showing an arrangement of three sensors and a glass block assembly as may be used with the embodiment of FIG. 16.
Figure 19:
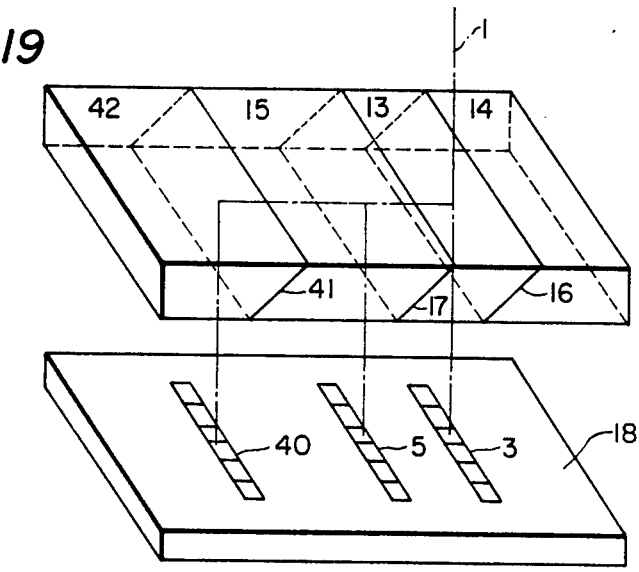
FIG. 19 is a perspective view of the arrangement of FIG. 18.

FIG. 18 is a sectional view showing an arrangement of three sensors and a glass block assembly provided therefor while FIG. 19 is a perspective view of the same. The sensors 3, 5 and 40 are disposed at different optical distances from the photographing lens 2. The difference between the optical distances of the sensors 3 and 5 corresponds to 2A in FIG. 17 and to J in FIG. 18. The optical distance between the sensors 3 and 5 is $2A=J/n$, where n is the refractive index of the glass block 13. The difference between the optical distances of the sensors 5 and 40 corresponds to E in FIG. 17 and to K in FIG. 18. The optical distance between the sensors 5 and 40 is $E=K/n$. The sensors 3 and 5 are disposed on both sides of the film surface and spaced by the distance A therefrom. In FIG. 18, reference numeral 27 designates a light shielding plate to block unwanted light.

In FIG. 19, the glass block assembly is separated from the sensors in order that the construction and arrangement thereof can be clearly seen. However, in practice, they are disposed adjacent to each other.

Figure 20:
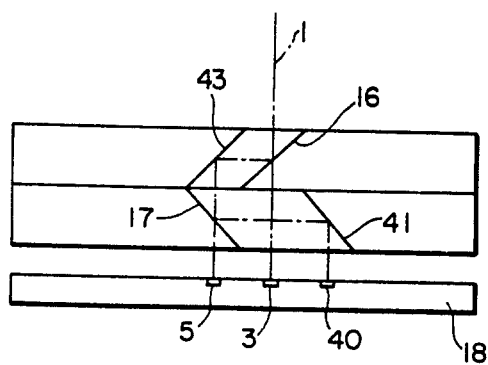
FIG. 20 shows another example of a set of three sensors and glass blocks.

FIG. 20 shows a second example of a unit including glass blocks and three sensors. In this example, two layers of glass block assemblies are employed to reduce the distance between the sensors. Light directed along the optical axis 1 is divided into two parts by a half-silvered mirror 16. One of the two parts, the light passing through the half-silvered mirror, is applied to the sensor 3. The other part is reflected by a mirror 43 and is then divided into two parts by a half-silvered mirror 17. The light passing through the half-silvered mirror 17 is applied to the sensor 5 and the light reflected by the half-silvered mirror 17 is reflected again by a mirror 41 to the sensor 40. In this example, the distance between the sensors can be reduced and therefore the manufacturing cost of the arrays of light receiving elements can accordingly be decreased.

Figure 21:
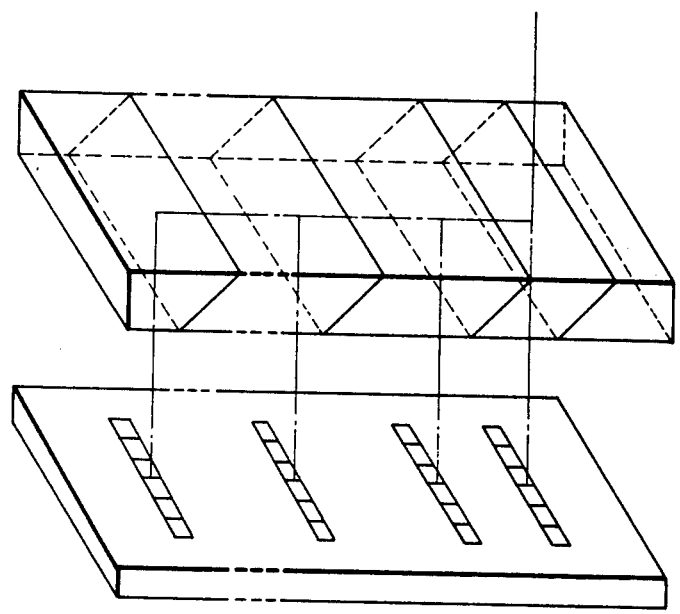
FIG. 21 is a perspective view of the arrangement of FIG. 20.

FIG. 21 is a perspective view showing another example of the unit including the glass blocks and sensors. In this example, the number of sensors provided is at least four. That is, FIG. 21 illustrates the general case in which a number of sensors which are arranged parallel to one another at intervals less than 2F in FIG. 17.

Figure 22:
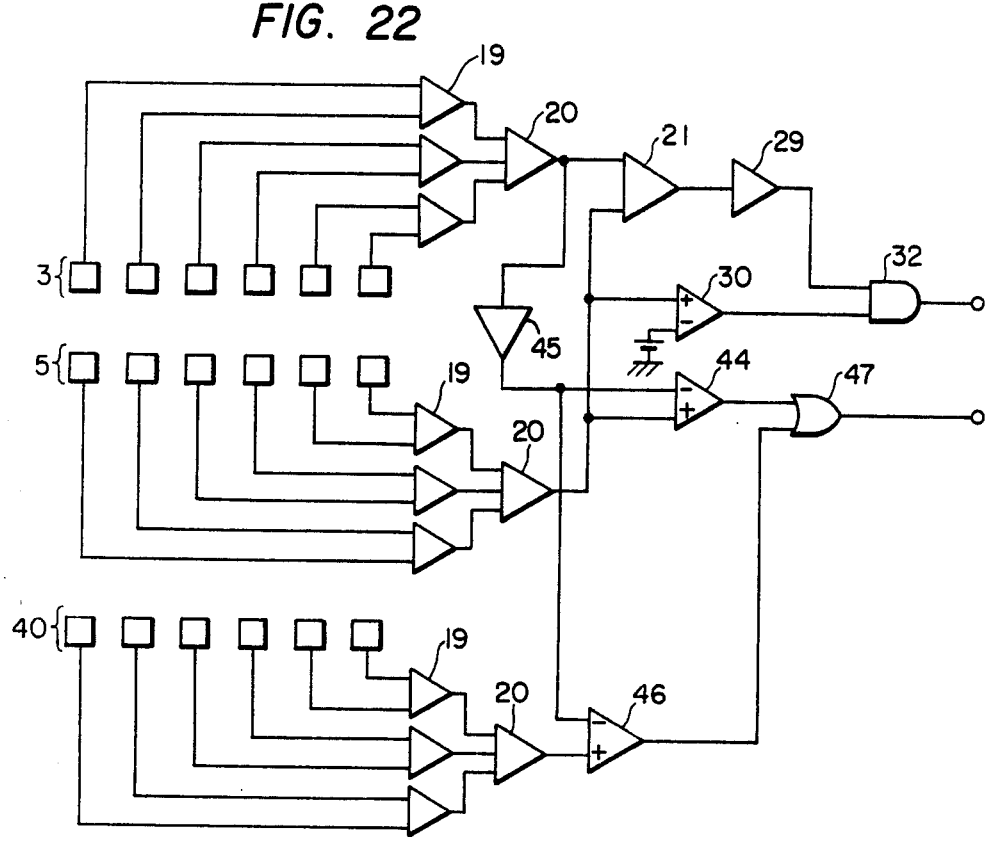
FIG. 22 shows another example of a processing circuit as may be used with the invention.

Another example of the processing circuit is as shown in FIG. 22. The operation of the processing circuit in which three focalization signals, namely those indicating front focus, rear focus and correct focus signals are obtained from the outputs of the sensors will be described. In this example, each of the sensors 3, 5 and 40 is made up of six light receiving elements which have uniform photoelectric characteristics. The outputs of two adjacent light receiving elements are compared with each other in a circuit 19 so that the absolute value of the difference between the outputs is obtained. The absolute values outputted by the circuits 19 are summed in a circuit 20 whereby the contrast output of the respective sensor is provided.

Figure 11:
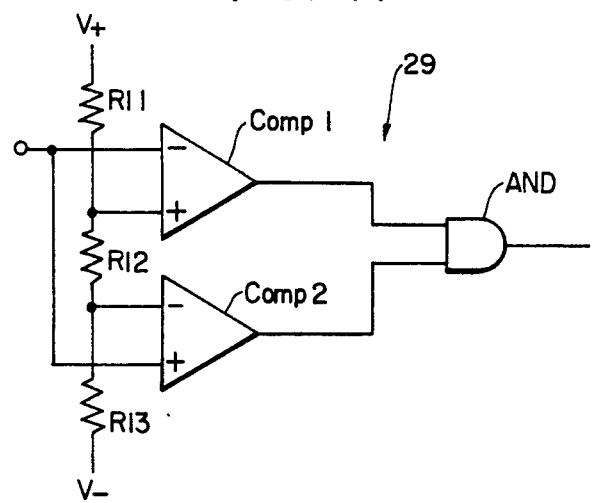
FIG. 11 is a circuit diagram of a window comparator used in the circuit of FIG. 8.

In this fashion, the contrast outputs 3a, 5a and 40a of the sensors 3, 5 and 40 are provided by the respective circuits 20. As described above, when $3a<5a$ or $3a<40a$, the lens is focused behind the object and, when $3a=5a$ and $3a$ or $5a$ is positive, the lens is correctly focused on the object. In the remaining case, the lens is focused in front of the object. In order to make this decision, the contrast output 3a is compared with the contrast output 5a in a differential amplifier 21. A window comparator 29, shown in detail in FIG. 11, determines with the noise or the like taken into account whether the difference between the two outputs 3a and 5a is zero. If the difference is in fact zero, the output of the circuit 29 is raised to "H". A comparator 30 determines whether or not the output 5a is positive. When the output 5a is positive, the output of the comparator 30 is set to "H". The outputs of the two comparators 29 and 30 are applied to an AND gate 32. When the two outputs are at "H", the AND gate 32 outputs an "H" signal which is a focalization signal. When the photographing lens is not correctly focused on the object, the output of the AND circuit 32 is at "L".

Next, the operation of the defocus direction detector circuit will be described. In this connection, the contrast output 5a may be greater than the contrast output 3a because of the presence of noise in a region such as that indicated by B in FIG. 17. In order to eliminate this problem, an analog adder circuit 45 is used to elevate the signal 3a and 3' indicated by the dotted line in FIG. 17. The elevated contrast output 3' and the contrast output 5a are compared in a comparator 44. When the contrast output 5a is greater than output 3', the comparator outputs an "H" signal. However, for rear focus, the signal 3' due to the elevation increment should not be greater than the contrast outputs 5a and 4a in the range H. The contrast output 3' is compared with the contrast output 40a in a comparator 46. When the contrast output 40a is greater, the comparator 46 produces an "H" output. The outputs of the comparators 44 and 46 are applied to an OR circuit 47. When the output of the comparator 44 or 46 is at the "H" level, the OR circuit 47 produces an "H" output. Thus, at the point of correct focus, the output of the AND circuit 32 is at "H", at the point of front focus the output of the OR circuit 47 is at "L", and at the point of rear focus the output of the OR circuit 47 is at "H".

In the case that two sensors are provided, one to several millimeters is sufficient for the distance between the two sensors. Therefore the required thickness of the glass block assembly will be on the order of 1 mm in the direction of the optical axis. Similarly, for three sensors, the thickness of the glass block assembly may be less than 2 mm. Accordingly, it can be placed in a space which is substantially equal to the space occupied by the cover glass of an ordinary line sensor.

Furthermore, if three sensors are employed, the device may be formed as a flat package utilizing IC techniques. Similar to the first example, a self-scanning type image sensor may be employed as the sensor.

Figure 23:
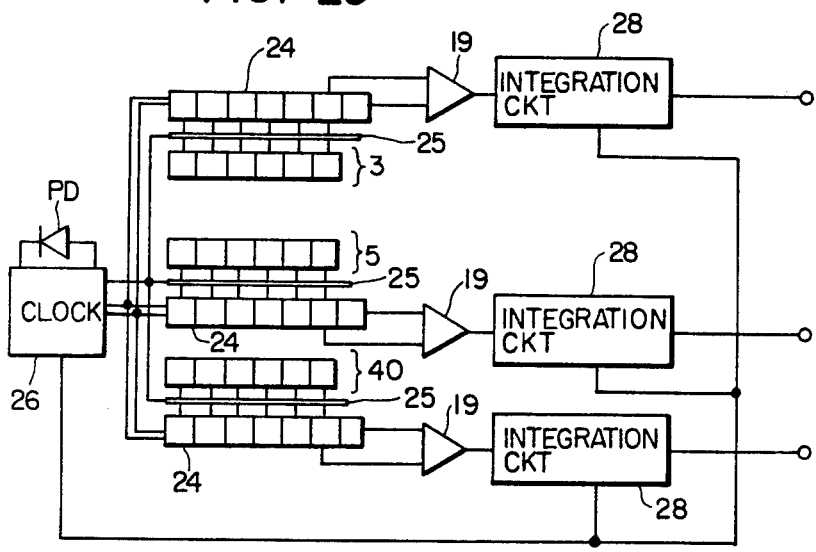
FIG. 23 shows a further example of a processing circuit which may be used with the invention.

Another example of a processing circuit using self-scanning type image sensors and analog charge transfer elements (CCD or BBD) will be described with reference to FIG. 23. The outputs of arrays of light receiving elements or sensors 3, 5 and 40 are transferred through corresponding transfer gates 25 to transfer elements 24 and are shifted to the right as viewed in FIG. 23 in response to clock or transfer pulses generated by a clock pulse and reset pulse generator 26. The number of transfer elements 24 is larger by one bit than the number of light receiving elements in each array. The assembly of transfer elements 24 has taps so that the signal at the last transfer element and the signal at the transfer element next to the last element can be simultaneously outputted. Accordingly, the outputs of adjacent light receiving elements are simultaneously applied to a respective comparison circuit 19. The construction of the comparison circuit 19 is similar to that of the comparison circuit shown in FIG. 9. The comparison circuit 19 operates to produce the absolute value of the difference between two input signals. The difference absolute value signal which is produced by the circuit 19 is integrated by an integration circuit as shown in FIG. 15 as a result of which a contrast output is provided at the output of the integration circuit. The technique used for producing a defocus signal and a focus signal through comparison of the contrast outputs is similar to that described with reference to FIG. 22. In FIG. 23, reference character PD designates a photodiode which is used to modulate the clock speed.

The focus detecting device may be so arranged that the film surface does not lie between the sensors 3 and 5. The contrast output of the sensor 3 is equal to that of the sensor 5 when the image plane is at the center of the distance between the sensors 3 and 5. However, the device may be so designed as to satisfactorily operate whether or not the film surface is at the center. If the film surface is shifted by a particular value Δx toward the rear focus side from the position indicated by 0 in FIG. 4 or 17, then the outputs of the sensors 3 and 5 will be equal to each other only when the amount of front focus is Δx. Therefore, if the value Δx is known, the focalization position, namely, where the amount of defocus is zero, can be detected. That is, it is not alway necessary to determine the positions of the sensors 3 and 5 and the film surface. The focalization position can be detected if the amount of shift of the film surface is known. Thus, the limit in positioning these elements and the accuracy in manufacture can be lowered.

As is apparent from the above description, the focus detecting device according to the invention is small enough to be readily incorporated in a camera yet it can detect all three focalization states, front focus, near focus and correct focus.

What is claimed is:

1. A focus detecting device for a camera comprising: two groups of light receiving elements disposed on the optical axis of a photographing lens in two planes which are parallel to each other with one of said planes lying on each side of a plane optically equivalent to a film surface; means for dividing a light flux of an image on an object to be photographed into a plurality of light fluxes directed continuously onto a light receiving surface formed by said respective groups of light receiving elements on a substrate; circuit means for analyzing outputs of said two groups of light receiving elements for detecting the amount of high frequency components in the spatial frequency spectrum of the image of an object to be photographed on each of said groups of light receiving elements; and a processing circuit for producing a signal representative of correct focalization when the amounts of high frequency components thus detected are higher than a predetermined level and are equal to each other.

2. The device as claimed in claim 1 wherein said two groups of light receiving elements are two self-scanning type image sensors.

3. The device as claimed in claim 1 wherein said processing circuit produces a signal indicative of correct focalization when said high frequency components for both said groups are equal and the sum of said two high frequency components is higher than a predetermined level.

4. The device as claimed in any of claims 1, 2, or 3, wherein said analyzing circuit comprises: a plurality of comparators for determining the absolute value of the difference between two input signals coupled thereto, said comparators being coupled to receive inputs from adjacent elements; and a plurality of means for summing outputs from said comparator, one of said summing means being provided for each group of light receiving elements.

5. The device as claimed in any of claims 1, 2, or 3, wherein said analyzing circuit comprises: a plurality of charge shifting means, one of said charge shifting means being provided for each group of light receiving elements, each of said charge shifting means being coupled to receive input signals from elements within its corresponding group; means coupled to end two positions of each of said charge shifting elements for comparing signals from said end two positions for determining the absolute value of the difference between said two signals of said end two positions; and means for integrating an output signal from each of said comparing means.

6. The device as claimed in claims 1, 2, or 3, wherein said groups comprise linear arrays of light receiving elements, said means for dividing a light flux comprises a number of mirrors each disposed relative to the respective linear arrays of said groups of light receiving elements for receiving a light flux of an image of an object to be photographed and dividing it into a number of light fluxes corresponding to the number of groups and directing said fluxes onto said linear arrays and, wherein said light receiving elements are electronically scanned in a direction transverse to the optical axis.

7. A focus detecting device for a camera comprising: two groups of light receiving elements disposed on the optical axis of a photographing lens in two planes which are parallel to each other with one of said planes lying on each side of a plane optically equivalent to a film surface; means for dividing a light flux of an image of an object to be photographed into a plurality of light fluxes directed continuously onto a light receiving surface formed by said respective groups of light receiving elements on a substrate; circuit means for analyzing outputs of said two groups of light receiving elements for detecting the amount of high frequency components in the spatial frequency spectrum of the image of an object to be photographed on each of said groups of light receiving elements; a processing circuit for producing a signal representative of correct focalization when the amounts of high frequency components thus detected are higher than a predetermined level and are equal to each other; and a third group of light receiving elements positioned parallel to said plane optically equivalent to a film surface and one of said first-mentioned two groups of light receiving elements at a distance greater than that of the distance of either of said two groups of said optically equivalent plane, said third group of light receiving elements being coupled to said analyzing circuit for the purpose of increasing the range of defocus in which said signals can be compared.

8. A focus detecting device for a camera comprising: two groups of light receiving elements disposed on the optical axis of a photographing lens in two planes which are parallel to each other with one of said planes lying on each side of a plane optically equivalent to a film surface; means for dividing a light flux of an image of an object to be photographed into a plurality of light fluxes directed continuously onto a light receiving surface formed by said respective groups of light receiving elements on a substrate; circuit means for analyzing outputs of said two groups of light receiving elements for detecting the amount of high frequency components in the spatial frequency spectrum of the image of an object to be photographed on each of said groups of light receiving elements; and a processing circuit for producing a signal representative of correct focalization when the amounts of high frequency components thus detected are higher than a predetermined level and are equal to each other; and a plurality of groups of light receiving elements, said groups of said plurality of groups being positioned at predetermined positions parallel to said first-mentioned two groups of light receiving elements and said plane optically equivalent to a film surface at a distance from either of said two groups greater than the distance of either of said two groups to said optically equivalent plane, said groups of said plurality of groups being coupled to said analyzing circuit for the purpose of increasing the range of defocus in which said signals can be compared.

* * * * *